(12) United States Patent
Shah et al.

(10) Patent No.: US 11,360,748 B2
(45) Date of Patent: Jun. 14, 2022

(54) SYSTEM AND METHOD OF COLLECTIVELY TRACKING A BEHAVIOR OF A MEMBER ACROSS ONE OR MORE DIMENSIONS

(71) Applicant: Loyalty Juggernaut, Inc., Palo Alto, CA (US)

(72) Inventors: Kalpak Shah, Palo Alto, CA (US); Azeem Mohammed, Hyderabad (IN); Shyam Shah, San Jose, CA (US)

(73) Assignee: Loyalty Juggernaut, Inc., Palo Alto, CA (US)

( * ) Notice: Subject to any disclaimer, the term of this patent is extended or adjusted under 35 U.S.C. 154(b) by 0 days.

(21) Appl. No.: 17/576,817

(22) Filed: Jan. 14, 2022

(65) Prior Publication Data
US 2022/0137935 A1    May 5, 2022

Related U.S. Application Data

(63) Continuation-in-part of application No. 16/866,456, filed on May 4, 2020, now Pat. No. 10,713,016.

(51) Int. Cl.
| | |
|---|---|
| *G06F 8/34* | (2018.01) |
| *G06K 9/62* | (2022.01) |
| *G06Q 30/02* | (2012.01) |

(52) U.S. Cl.
CPC ............. *G06F 8/34* (2013.01); *G06K 9/623* (2013.01); *G06Q 30/0211* (2013.01)

(58) Field of Classification Search
None
See application file for complete search history.

(56) References Cited

U.S. PATENT DOCUMENTS

| | | | |
|---|---|---|---|
| 8,352,903 B1 * | 1/2013 | Friedman | ................... G06F 8/34 |
| | | | 717/136 |
| 2012/0191446 A1 * | 7/2012 | Binsztok | ................. G06F 8/436 |
| | | | 704/9 |

(Continued)

OTHER PUBLICATIONS

Abadi et al., "TensorFlow: Large-Scale Machine Learning on Heterogeneous Distributed Systems," OSDI'16: Proceedings of the 12th USENIX conference on Operating Systems Design and Implementation, 2016, 19pg. (Year: 2016).*

(Continued)

*Primary Examiner* — Ryan D. Coyer

(57) ABSTRACT

A method of triggering an action by collectively tracking a behavior of a member across a plurality of dimensions is provided. The method includes obtaining, an action rule that specifies the action when the member performs the behavior in the plurality of dimensions, specifying a tensor counter that is a data structure to track the behavior based on the action rule, comprising a first data object storing name of behavior and a second data object comprising a plurality of keys and a plurality of values, determining the name and an updated value of the behavior, and a dimension associated with the behavior, modifying a value associated with the key to track the behavior of member in the dimension, updating the tensor counter to collectively track the behavior of member across the dimensions, and triggering the action to the member when the behavior of member matches the action rule.

20 Claims, 16 Drawing Sheets

(56) References Cited

U.S. PATENT DOCUMENTS

| | | | | |
|---|---|---|---|---|
| 2013/0031526 A1* | 1/2013 | Bernelas | ............... | G06F 8/31 |
| | | | | 717/100 |
| 2013/0185694 A1* | 7/2013 | Taylor | ............... | G06F 9/4806 |
| | | | | 717/104 |
| 2014/0282586 A1* | 9/2014 | Shear | ............... | G06F 16/248 |
| | | | | 718/104 |
| 2019/0102496 A1* | 4/2019 | Bishop | ............... | G06F 9/453 |
| 2019/0272157 A1* | 9/2019 | Stella | ............... | G06F 40/143 |

OTHER PUBLICATIONS

Hall et al., "Infra: Structure All the Way Down—Structured Data as a Visual Programming Language," ACM, 2017, 18pg. (Year: 2017).*
Karaila et al., "Applying Template Meta-Programming Techniques for a Domain-Specific Visual Language—an Industrial Experience Report," IEEE, 2007, 10pg. (Year: 2007).*
Kurihara et al., "A Programming Environment for Visual Block-Based Domain-Specific Languages," ACM, 2015, 9pg. (Year: 2015).*

* cited by examiner

| Sponsor Dimension | Counter Value |
|---|---|
| Vox Cinema | 20 |
| Carrefour | 21 |

| Member ID | Offer ID | Location Dimension | Sponsor Dimension | Counter Value |
|---|---|---|---|---|
| M1 | O1 | Deira | Carrefour | 4 |
| M1 | O1 | Sharjah | VOX | 6 |

# SYSTEM AND METHOD OF COLLECTIVELY TRACKING A BEHAVIOR OF A MEMBER ACROSS ONE OR MORE DIMENSIONS

CROSS-REFERENCE TO RELATED APPLICATIONS

This patent application is related to granted U.S. non-provisional patent application Ser. No. 16/866,456 filed on May 4, 2020, the complete disclosure of which, in its entirety, is hereby incorporated by reference.

TECHNICAL FIELD

The embodiments herein generally relate to tracking of behavior of a member, and more particularly, to a system and method of collectively tracking a behavior of a member across one or more distinct dimensions.

DESCRIPTION OF THE RELATED ART

For a large database, applying rules through visual language is not similar to applying it to a text language. Applying rules to visual programming language need programming environment. Traditional graphical user interface (GUI) development toolkits are inadequate for the creation of visual programming language (VPLs) because they do not support syntactic and semantic specifications of visual programming. The graphical user interface of a visual language relates to the language's syntax and semantics. The interaction (dialogue) between the interface, the syntax, and the semantics must be maintained. Implementing a VPL interface and its support for syntactic and semantic specifications of visual programming suffers from a problem common to all large, complex software systems, i.e., the generation is difficult and time-consuming. There remains a need for a method for enabling implementation of rules to enable multiple functions with ease with a supportive visual programming language. A counter is a container which is used to store counts of a particular behavior of a member. The counter may also be called a member counter, a scalar counter. Some example use-cases of a counter are tracking visits of a member in a particular location, tracking spends of a member in particular business, tracking number of flights taken by a member, etc. Traditionally, to update a counter, a name of the counter and a value which is to be set in the counter is required. Hence, a counter stores a single value in it. This means that for each use-case, a counter can only store counts for a single attribute.

Further in the supportive visual programming language, when there is a need to track a particular attribute in variations of a plurality of situations, say N, then accordingly, N number of counters are required for. This makes business users write business rules N times to operate N counters. Scenario: a Loyalty program has 100 business locations, and the Loyalty program wants to reward Members if they do 5th transactions in a single store. To implement this rule, the program needs to track the Member's visit count per location. To do so, as described in FIG. 1, the program needs to maintain 100 counters, one counter per store. The counters will be named like "Visit-Count-loc-1" 102A, "Visit-Count-loc-2" 102B, . . . , "Visit-Count-loc-100" 102N. To reward the member, the rules need to compare the location ID in the BIT for each counter in following way.

Accordingly, there remains a need for a method of triggering an action by collectively counting a behavior of a member across a plurality of dimensions.

SUMMARY

In view of the foregoing, there is provided a processor-implemented method of triggering an action by collectively tracking a behavior of a member across a plurality of dimensions using a tensor counter for access by a visual programming application program being executed on a data processing system. The method includes (a) providing, using the visual programming application program, a visual programming window that is enabled to receive (i) a user input at the tensor counter (ii) a user selection from selectable options of visual programming blocks, wherein the user input and the user selection is transferred to a template program, wherein at least one of the visual programming blocks comprise of the tensor counter, (b) obtaining, from the tensor counter, the user input that is associated with an action rule that specifies the action when the member performs the behavior collectively across the plurality of ranks, wherein the plurality of ranks include at least one of a first dimension, a second dimension and an $N^{th}$ (a positive integer) dimension in which the behavior associated with the member is tracked collectively, (c) specifying the tensor counter that is a data structure comprising the plurality of ranks to track the behavior of the member based on the action rule, comprising, for each dimension, a first data object that stores a name of the behavior and a second data object that comprises a plurality of keys and a plurality of values associated with the plurality of keys, (d) determining, upon receiving a transaction data associated with the member, the name of the behavior, a dimension associated with the behavior and an updated value of the behavior with respect to the plurality of dimensions, (e) indexing at least one key of the second data object, wherein the at least one key is determined based on the dimension, (f) modifying a value associated with the key using the updated value of the behavior to track the behavior of the member in the dimension associated with the key, (g) updating the tensor counter that comprises the first data object and the second data object to track the behavior of the member collectively across the plurality of dimensions, and (h) triggering the action to the member when the behavior of the member matches the action rule.

The method is of advantage that it provides a computationally efficient way of specifying and implementing the tensor counter by eliminating a need to specify a counter for each combination of the plurality of dimensions. Further, the method reduces a storage requirement by only storing data associated with those combinations of the plurality of dimensions instead of storing data associated with all possible combinations of the plurality of dimensions. Further, the method provides efficient personalization for member tracking in a computationally efficient way as a read operation of the tensor counter requires only a single value to be read.

The method is of advantage that collectively tracking the behaviour of the member across the plurality of dimensions is fast in computational processing and occupies less database storage compared to existing methods of applying visual programming rules.

In some embodiments, the tensor counter comprises a plurality of thresholds for each member, wherein different actions are triggered when the behavior of the member matches the action rule with respect to the plurality of thresholds. In some embodiments, the tensor counter comprises a plurality of thresholds for each member, wherein different actions are triggered when the behavior of the member matches the action rule with respect to the plurality of thresholds. Enabling the plurality of thresholds for each member gives flexibility to set multiple action rules rewarding the member on reaching the plurality of thresholds in ascending order of qualified actions as defined by the action rules. Also, the action rules don't need to be set again once a threshold from the plurality of the thresholds is reached, saving time and cost of the operation.

In some embodiments, the tensor counter is configured to track a target across a plurality of members for an offer rule. This has an advantage of tracking an offer rule across various dimensions and members to analyse the various outcomes of the offer rule.

In some embodiments, the tensor counter is specified visually by using the visual programming application program.

In some embodiments, each of the visual programming blocks is associated to a template program that translates one or more characteristics of the visual programming block to a domain specific language.

In some embodiments, the method further comprises collectively tracking an activity level behavior of the member that includes an economic activity or a social media activity using the tensor counter.

In some embodiments, the method further comprises collectively tracking an offer level behavior of the member that includes a plurality of activity level behavior using the tensor counter.

In some embodiments, a performance score for the member is determined using a plurality of tensor counters that are associated with the member.

In some embodiments, the tensor counter is stored in a non-relational database.

In another aspect, there is provided for collectively tracking a behavior of triggering an action by tracking a behavior of a member collectively across a data set using a plurality of ranks in a tensor counter of at least one visual programming block for access by a visual programming application program being executed on a data processing system. The memory system includes a visual programming application program that includes a visual programming window that is enabled to receive (i) a user input at a tensor counter (ii) a user selection from selectable options of visual programming blocks, wherein the user input and the user selection is transferred to a template program, wherein at least one of the visual programming blocks comprise of a tensor counter, and (b) the tensor counter stored in a memory, wherein the tensor counter is a data structure and includes information resident in a database used by the visual programming application program and includes, for each of a plurality of dimensions: (i) a first data object configured to store a name for the behavior and (ii) a second data object for each of the plurality of dimensions, wherein the second data object comprises a plurality of keys associated with the first data object that provide an index for a dimension, including at least one of a first dimension, a second dimension and an $N^{th}$ (a positive integer) dimension in which the behavior associated with the member is tracked collectively, wherein the plurality of dimensions are comprised by a plurality of ranks; and the second data object further comprises a plurality of values associated with the plurality of keys that determine a count of the behavior in the dimension.

The memory system is of advantage that it provides a computationally efficient way of specifying and implementing the tensor counter by eliminating a need to specify a counter for each combination of the plurality of dimensions. Further, the memory system reduces a storage requirement by only storing data associated with those combinations of the plurality of dimensions instead of storing data associated with all possible combinations of the plurality of dimensions. Further, the method provides efficient personalization for member tracking in a computationally efficient way as a read operation of the tensor counter requires only a single value to be read.

In some embodiments, the tensor counter is stored in a non-relational database.

In yet another aspect, there is provided one or more non-transitory computer-readable storage medium storing the one or more sequence of instructions, which when executed by the one or more processors, causes to perform a method of triggering an action by collectively tracking a behavior of a member across a plurality of dimensions using a tensor counter for access by an application program being executed on a data processing system. The one or more sequence of instructions include (a) providing, using the visual programming application program, a visual programming window that is enabled to receive (i) a user input at the tensor counter (ii) a user selection from selectable options of visual programming blocks, wherein the user input and the user selection is transferred to a template program, wherein at least one of the visual programming blocks comprise of the tensor counter, (b) obtaining, from the tensor counter, the user input that is associated with an action rule that specifies the action when the member performs the behavior collectively across the plurality of ranks, wherein the plurality of ranks include at least one of a first dimension, a second dimension and an $N^{th}$ (a positive integer) dimension in which the behavior associated with the member is tracked collectively, (c) specifying the tensor counter that is a data structure comprising the plurality of ranks to track the behavior of the member based on the action rule, comprising, for each dimension, a first data object that stores a name of the behavior and a second data object that comprises a plurality of keys and a plurality of values associated with the plurality of keys, (d) determining, upon receiving a transaction data associated with the member, the name of the behavior, a dimension associated with the behavior and an updated value of the behavior with respect to the plurality of dimensions, (e) indexing at least one key of the second data object, wherein the at least one key is determined based on the dimension, (f) modifying a value associated with the key using the updated value of the behavior to track the behavior of the member in the dimension associated with the key, (g) updating the tensor counter that comprises the first data object and the second data object to track the behavior of the member collectively across the plurality of dimensions, and (h) triggering the action to the member when the behavior of the member matches the action rule.

The method is of advantage that it provides a computationally efficient way of specifying and implementing the tensor counter by eliminating a need to specify a counter for each combination of the plurality of dimensions. Further, the method reduces a storage requirement by only storing data associated with those combinations of the plurality of dimensions instead of storing data associated with all possible combinations of the plurality of dimensions. Further, the method provides efficient personalization for member tracking in a computationally efficient way as a read operation of the tensor counter requires only a single value to be read In some embodiments, the tensor counter comprises a plurality of thresholds for each member, wherein different actions are triggered when the behavior of the member matches the action rule with respect to the plurality of thresholds.

In some embodiments, the tensor counter is configured to track a target across a plurality of members for an offer rule.

In some embodiments, the tensor counter is specified visually by using the visual programming application program.

In some embodiments, each of the visual programming blocks is associated to a template program that translates one or more characteristics of the visual programming block to a domain specific language.

In some embodiments, the method further comprises collectively tracking an activity level behavior of the member that includes an economic activity or a social media activity using the tensor counter.

In some embodiments, the method further comprises collectively tracking an offer level behavior of the member that includes a plurality of activity level behavior using the tensor counter.

In some embodiments, a performance score for the member is determined using a plurality of tensor counters that are associated with the member.

In some embodiments, the tensor counter is stored in a non-relational database.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 8A-B illustrate storing of an activity level tensor counter and an offer level tensor counter, according to some embodiments herein;

FIG. 10 is an exemplary screenshot of the user device of FIG. 2 that illustrates specifying different actions for different thresholds of a cumulative behavior that is tracked using the tensor counter of FIG. 8, according to some embodiments herein;

DETAILED DESCRIPTION

Figure 1:
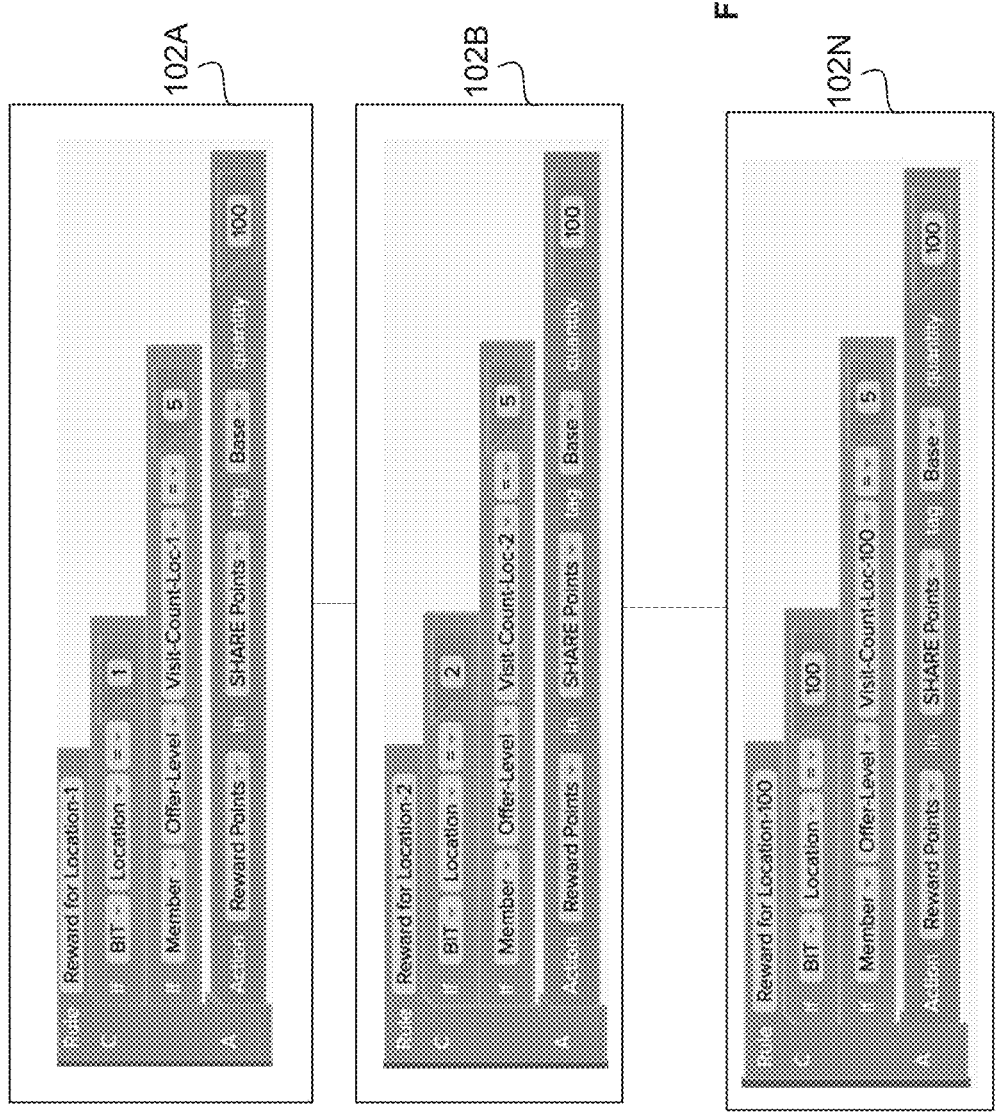
FIG. 1 illustrates a prior-art for tracking a behavior of a member across a plurality of dimensions.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a method of triggering an action by collectively tracking a behavior of a member across a plurality of dimensions using a tensor counter. Referring now to the drawings, and more particularly to FIGS. 1 to 14, where similar reference characters denote corresponding features consistently throughout the figures, there are shown preferred embodiments.

A tensor counter allows tracking member behavior in different situations and a single counter stores values for each of the situations. The tensor counter has one or more rank, which enables tracking member behavior to be performed across one or more dimensions. The tensor counter allows passing the distinct combination of the plurality of dimensions as an additional input to read the value of the counter. To update a tensor counter, the name of the counter, the situation/index, and value to set in that situation/index in the counter is required. In an embodiment, the one or more dimensions may include a location dimension, a store dimension, and a sponsor dimension. The tensor counter may have n (a positive integer) number of keys for n dimensions.

The plurality of dimensions may include a combination of a location, a business entity, a date and a time dimension, and financial details of the member. Further, "behaviour" may be described as an activity or a transaction. For example, in a scenario where the first dimension is a city, the second dimension is a restaurant and there are 10 restaurants located in a city, the behavior may be 5 transactions being performed by the member at any one of the 10 restaurants, or the behavior may be 10 transactions being performed at any 5 of the 10 restaurants. In an embodiment, the Nth dimension may be associated with a parent company of the restaurant or to the time of the visit, for example.

Figure 2:
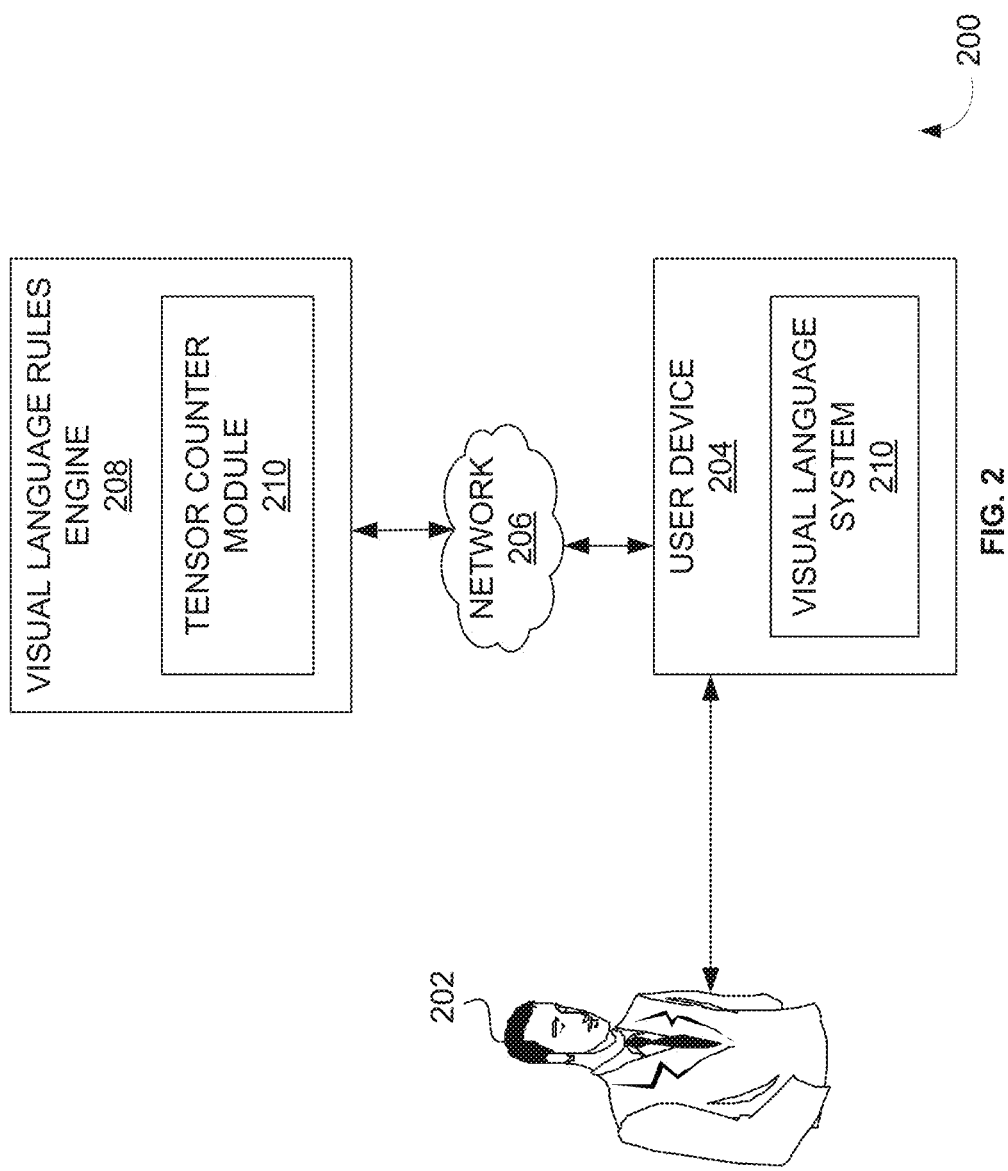
FIG. 2 illustrates a system for triggering an action by collectively tracking a behavior of a member across a plurality of dimensions using a tensor counter, according to some embodiments herein.

FIG. 2 illustrates a system 200 for triggering an action by collectively tracking a behavior of a member across a plurality of dimensions using a tensor counter for access, according to some embodiments herein. The system 100 includes a user 202 associated with a user device 204. The user device 204 comprises a visual language system 210 that communicates to a visual language rules engine 208 with a network 108. The user device 204 is connected via a network 206 to a visual language rules engine 208 that comprises a tensor counter module 210. The visual language rules engine 208 is also referred to as "visual programming application program". The visual language rules engine 208 (i) executes the rules program as an action, (ii) updates attributes and member attributes in a rules database and (iii) communicates an output to the visual language system 106 that displays the rules selection on the visual programming window of a user interface with interactive sequence selectable visual programming blocks arrangement. Using the visual rules engine 208, a visual programming window may be provided, that is enabled to receive (i) a user input at the tensor counter (ii) a user selection from selectable options of visual programming blocks, wherein the user input and the user selection is transferred to a template program, wherein at least one of the visual programming blocks comprise of the tensor counter.

The tensor counter module 210, may be configured to obtain, from the tensor counter, the user input that is associated with an action rule that specifies the action when the member performs the behavior collectively across the plurality of ranks, wherein the plurality of ranks include at least one of a first dimension, a second dimension and an $N^{th}$ (a positive integer) dimension in which the behavior associated with the member is tracked collectively. The tensor counter module 210 may the tensor counter that is a data structure comprising the plurality of ranks to track the behavior of the member based on the action rule, comprising, for each dimension, a first data object that stores a name of the behavior and a second data object that comprises a plurality of keys and a plurality of values associated with the plurality of keys. The tensor counter module 210 provides a computationally efficient way of specifying and implementing the tensor counter by eliminating a need to specify a counter for each combination of the plurality of dimensions. Further, the tensor counter module 210 reduces a storage requirement by only storing data associated with those combinations of the plurality of dimensions instead of storing data associated with all possible combinations of the plurality of dimensions.

The tensor counter module 210 may determine, upon receiving a transaction data associated with the member, the name of the behavior, a dimension associated with the behavior and an updated value of the behavior with respect to the plurality of dimensions. The tensor counter module 210 may at least one key of the second data object, wherein the at least one key is determined based on the dimension. The tensor counter module 210 may be configured to modify a value associated with the key using the updated value of the behavior to track the behavior of the member in the dimension associated with the key. The tensor counter module 210 may be configured to update updating the tensor counter that comprises the first data object and the second data object to track the behavior of the member collectively across the plurality of dimensions. The tensor counter module 210 may be configured to trigger the action to the member when the behavior of the member matches the action rule.

Figure 3:
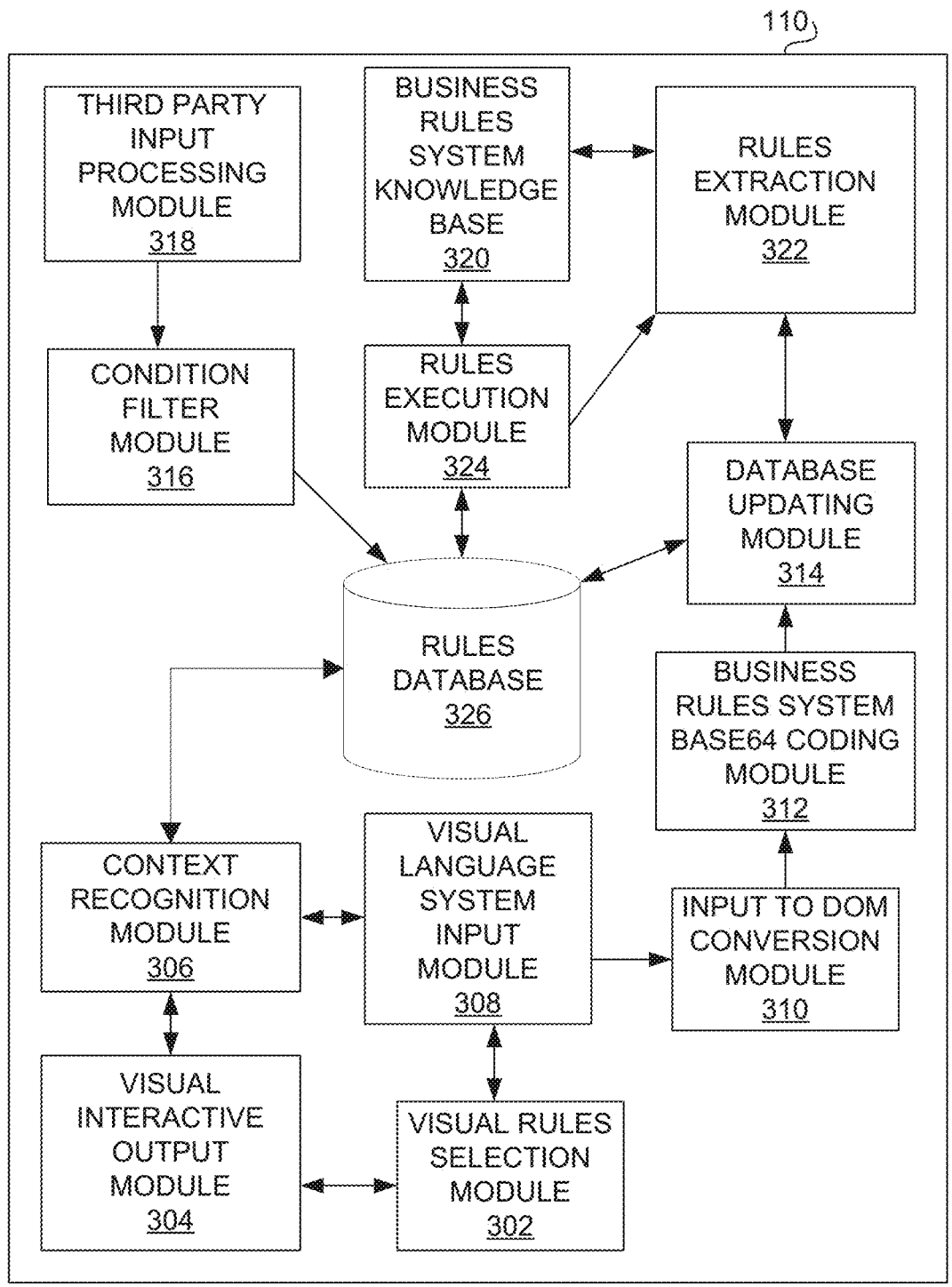
FIG. 3 illustrates an exploded view of a visual language rules engine of FIG. 2 according to an embodiment herein.

FIG. 3 illustrates an exploded view of the visual language rules engine 208 of FIG. 1 according to an embodiment herein. The visual language rules engine 308 includes the rules database 326, a visual rules selection module 302, a visual interactive output module 304, a context recognition module 306, a visual language system input module 308, an input to DOM conversion module 310, a business rules system base64 coding module 312, a database updating module 314, a condition filter module 316, a third party input processing module 318, a business rules system knowledge base 320, a rules extraction module 322 and a rules execution module 324. The visual rules selection module 302 enables the user input at the user interface for a user selected sub category of visual programming blocks. The visual interactive output module 304 generates previously executed visual programming block on the user interface. The context recognition module 306 places the selected sub category visual programming block in relation with the previously selected category or sub category of visual programming blocks and provides predetermined visual programming block predictions for the next selection by the user according to the category or sub category of the visual programming block selected and communicates the visual programming block with the context to the business rules system knowledge base 320. The visual language system input module 308 saves the user input as a rule in the business rules system knowledge base 320. The input received at visual language system input module 308 is converted to DOM (document object model) at the input to the DOM conversion module 310 and further processed at the business rules system base64 coding module 312. The database updating module 314 updates the rules database 326 and the business rules system knowledge base 320 on execution of any rules. The condition filter module 316 determines a rule to be executed from the business rules system knowledge base 320 based on the member inputs. The condition filter module 316 also updates the rules database 326 with the input of predetermined transactions or member or customer activity. The third party input processing module 318 interacts with third-party inputs of predetermined transactions or predetermined user activity. The business rules system knowledge base 320 stores the user inputs. The Rules extraction module 322 is activated when the condition filter module 316 determines a rule to be executed from the business rules system knowledge base 320. The rules execution module 324 executes the rules which are communicated to visual interactive output module 304, which is further communicated to a context recognition module 306 and connected to the visual language system input module 308 and visual rules selection module 302. The visual rules selection module 302 reacts to the input and selects a further visual interactive block from the rules database 326 based on the context at the context recognition module 306.

In an embodiment, the first rule is set using a category which determines sub-categories of visual programming blocks for generating a rules program related to a particular application. For example, counting member value based on purchase value or transaction, influence and ease of business parameters for a plurality of airline members and selecting offers based on each of these parameters for each of the plurality of the members.

Each parameter is weighed differently according to pre-determined numbers as calculated in relation to the application.

In an embodiment, setting up the category allows the user the logic to select the subsequent sub categories defining rules by either selecting from the options suggested or entering a new rule using a visual programming block.

The user may choose the plurality of the sub categories of the visual programming blocks as per their requirement. There are multiple sub-categories of the visual programming blocks. Few examples are given in the table below.

| Sub category | Function | Customized to | Connected to from a first side | Connected to from a second side |
|---|---|---|---|---|
| Activity block | Define an activity | Allow selection filter of the activity | Category defining visual programming block 302 | Action block or condition block |
| Event block | Define an event | Allows defining of an event | Category defining visual programming block 302 | Action block, rule block or line rule block |
| Filter block | If- then for unless- then situation filter | Filter rules | a rule block | Action block, condition block, equation block, static value block, text rule block |
| Action block | Determining action for executing rules | Determine rules | A Condition block | Equation block, Member Attribute block, Activity Attribute block |
| Member Action | Determining action on member for executing rules | Determine rules | Condition blocks | Equation block, Member Attribute block, Activity Attribute block |
| Equation block | a mathematical equation or formula involving one or more entity variables and static values | Receive variable input and static values | Condition block or action block | Attribute block (member and activity) attribute block or static value block |
| Date Operation Block | a mathematical formula involving one or more entity variables of date types and static values | Receive variable input of date types and static values | Condition block or action block | Attribute block or member attribute block or static value block |
| Attribute block | to select specific level or the aspect of the attribute or suggest appropriate operator based on user selection | Reads the values of member, BIT, or Product data | Condition block or action block | |
| Conversion block | To provide the conversions for various entities like the currency, reward rate, award rate | Reads the value of Currency conversion, awards rate, reward rate, and Sponsor base rate from the program setup | Condition block or action block | |
| rule condition block | To allow setting up conditions to qualify the rule | Adopt various level of data like member attribute at offer/activity/program level, member data, attribute data type, etc. | Rule block | Action block, condition block, equation block, data equation block, conversion block, static value block, text value |

-continued

| Sub category | Function | Customized to | Connected to from a first side | Connected to from a second side |
| --- | --- | --- | --- | --- |
| rules block | To allow setting up rules which is built using conditions and actions | Provide nesting for rules | Rule block | Condition or action block |
| Line rule block | To allow setting up rules which is built using conditions and actions on line items (purchased SKUs) level | Allows iterating over line items (purchased SKUs) | Activity Block or Rule block | Condition or action block |

In an embodiment, the category defining visual programming block 302 is visually arranged into a configuration of category-sub category arrangement to set subsequent rules with different visual programming blocks. The visual programming blocks that may be attached to the category defining visual programming block are an activity block 304 and an event block as sub category of the visual programming blocks. The category defining visual programming block 302 may include any number of sub category of the visual programming blocks.

In some embodiments, the sub-categories of the visual programming block include a tensor counter visual programming block. The tensor counter is a data structure to track the behavior of the member based on the action rule, comprising a first data object that stores a name of the behavior and a second data object that comprises a plurality of keys and a plurality of values associated with the plurality of keys. The tensor counter visual programming block includes a tensor counter. In some embodiments, the tensor counter allows tracking a specific behavior of a member across one or more situations that can be distinct. The one or more situations may be distinct, and the behavior of the member may be different across the one or more situations. In an exemplary embodiment, the one or more situations may include the behavior of the member at a first retail store, and the behavior of the member at a second retail store.

A counter is described as a member attribute that tracks a particular behavior of the member. In an exemplary embodiment, member counters may include tracking one or more visits of the member in a particular store, tracking spend of the member in a particular enterprise, a number of flights taken by the member etc dimensions. Traditionally, a scalar counter is used and a name of the counter and a value to set in that counter is required. A scalar counter stores a single value in it. If the behavior of the member behavior is required to be tracked in N variations of situations, then 'N' number of counters are required which requires the user to specify a rule 'N' times to operate 'N' counters.

The tensor counter allows passing of a context as an additional input to read the value of the counter. To update the tensor counter, a name of the tensor counter, a situation/index, and the value to set in the situation/index in the counter may be required. In an exemplary embodiment, the tensor counter may store 100s of values. A single statement can read the value of the counter using the counter name and provide a location ID from where a transaction has been obtained. Hence, a single rule allows the user to store the one or more counts. To implement a rule using the tensor counter, the tensor counter may be defined as "visit count", and whenever the member does any transaction in at least one location, the tensor counter by the name "visit count" is incremented by passing the location ID. Thus "visit count" tensor counter keeps track of the visit count of a member by location, wherein there can be 100s of locations. e.g. 3 visits to Starbucks @ WTC, 5 visits at Starbucks @ Times Square.

In some embodiments, the tensor counter provides faster computational processing and occupies less database storage compared to the scalar counters. The tensor counter comprising 'n' values may be processed much faster compared to processing 'n' scalar counters, due to the fact that machines have an ability to process tensor operations in parallel and there is a speed-up of O(n) when compared to scalar counters.

In an example, rule one is 'base reward rule' evaluates a condition if the total Bill Amount is $100 or above and if the condition is satisfied, then it triggers two actions as follows (i) rewards points to the member equivalent to 1 point per $10 spent.

The rule 3, 4 and 5 may work together.

Rule three 'jeans purchase tracker' checks if the member's shopping basket includes a pair of Jeans i.e. the condition, and if the condition is satisfied, then the it flags a dynamically defined attribute at the activity level by the user 'order Includes jeans' as yes i.e. the action is determined.

Rule four 'jacket purchase tracker' checks if the member's shopping basket includes a Jacket i.e. condition, and if such condition is satisfied, then the it flags a dynamically defined attribute at the activity-level by the user 'order includes jacket' as yes i.e. the action is determined.

Rule five rule 'jeans & jacket bonus' checks the outcome of the above two rules by checking the values of the two dynamically defined attributes at the activity-level by the user 'order contains Jeans' and 'order contains Jacket' i.e. two conditions, and if the value set for both these attributes is 'yes' by the rules above, then it assigns two 'Enrique Iglesias live concert' passes, worth $50. The rules 3, 4, 5 are included inside the 'on activity' visual programming block. Thus, it is evaluated in real-time 'on-activity' as soon as the shopping activity is completed by the member, updates the a dynamically defined attribute by the user at the offer-Level 'total Amount Spent' by the member across all the orders during the offer period in a user-defined attribute.

For example, this rule is included inside the 'on activity' block. Thus, it is evaluated in real-time 'on-activity' as soon as the shopping activity is completed by the member. Rule two may be 'wicked wednesday bonus' evaluates a condition if the shopping was done on wednesday and if this condition is satisfied, the it assigns a 'Free Parking Pass' to the member of $10 value with an user selected action block.

This rule is included inside the 'on activity' visual programming block. Thus, it is evaluated in real-time 'on-activity' as soon as the shopping activity is completed by the member. In an example, Rule 6, 7 and 8 work together. These rules are included inside 'on event' visual programming block, which means these rules are evaluated only on occurrence of a user-defined event such as, at 12:00 AM of $1^{st}$ Day of every month throughout the offer period.

In an example, rule six may be 'monthly mini bonus' may check the total spend by the member at the end of every month as updated by the rule one in the dynamically defined attribute by the user at the offer level 'total amount spent' and if it is between $1,000 to $5,000 i.e. condition, it rewards 5% of the spend as the cashback in the form of e-cash i.e. action.

In an example rule seven may be 'monthly mega bonus' checks the total spend by the member at the end of every month as updated by the Rule one in the dynamically defined attribute by the user at the offer level 'total amount spent' and if it is above $5,000 i.e. condition, it rewards 10% of the spend as the cashback in the form of e-cash i.e. action. Rule eight may be 'reset amount spent' tracker resets the value of the dynamically defined attribute by the user at the offer level 'total amount spent' i.e. action. So that it starts accumulating members' spend for the new month from zero again. This rule doesn't require any condition. Here is an algorithm that illustrates the operation.

```
Activity-1 filter:
        bit.h_bit_type == "PURCHASE" // filter criteria
    rules:
    rule("Base Reward"):
        condition:
            bitHeader.bill_amount >= 100 // rule condition
        action:
            reward(tag="BASE", account_id = "1", value = header.bill_amount/10)
            updateCounter(level="offer", name="Total Amount Spent", value =
    header.bill_amount, type="add")
      rule("Wicked Wednesday Bonus"):
        condition:
            readAttributeD("h_bit_date", "DAY_OF_WEEK") == 3
        action:
            assignPrivilege(product="9914", value=10, quantity=1)
      rule("Jeans Purchase Tracker"):
        condition:
            bitLine.l_product_category == "Jeans"
        action:
            updateCounter(level="offer", name="Order Includes Jeans", value ="Yes",
    type="set")
      rule("Jackets Purchase Tracker"):
        condition:
            bitLine.l_product_category == "Jackets"
        action:
            updateCounter(level="offer", name="Order Includes Jacket", value =
    "Yes", type="set")
      rule("Jeans & Jacket Bonus"):
        condition:
            counter("Order Includes Jacket") == "YES" and counter("Order Includes
    Jeans") == "YES"
        action:
            assignPrivilege(product="9913", value=50, quantity=2)
      end rules
    end Activity-1
    Event-1
    rules:
      rule("Monthly Mini Bonus"):
        condition:
            counter(type="offer",name="Total Amount Spent") is between(1000,5000)
        action:
            reward(tag="BASE", account_id = "1", value =
    counter(type="offer",name="Total Amount Spent") * 0.05)
      rule("Monthly Mega Bonus"):
        condition:
            counter(type="offer",name="Total Amount Spent") >= 5001
        action:
            reward(tag="BASE", account_id = "1" value =
    counter(type="offer",name="Total Amount Spent") * 0.01)
      end rules
    end Event-1
```

Figure 4:
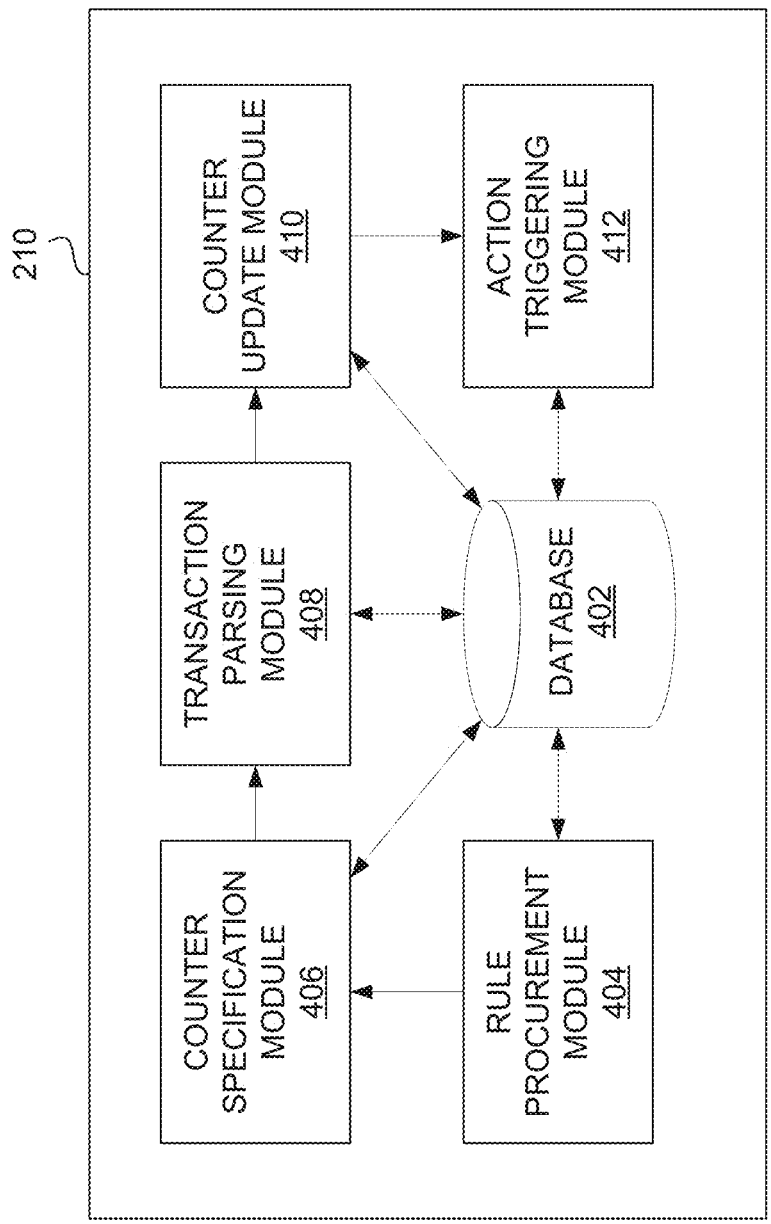
FIG. 4 illustrates an exploded view of a tensor counter module of FIG. 2, according to some embodiments herein.

FIG. 4 illustrates an exploded view of the tensor counter module 210 of FIG. 2, according to some embodiments herein. The tensor counter module 210 includes a database 402 connected to a rule procurement module 404, a counter specification module 406, a transaction parsing module 408, a counter update module 410 and an action triggering module 412. The rule procurement module 404 obtains, from the tensor counter, the user input that is associated with an action rule that specifies the action when the member performs the behavior collectively across the plurality of ranks, wherein the plurality of ranks include at least one of a first dimension, a second dimension and an $N^{th}$ (a positive integer) dimension in which the behavior associated with the member is tracked collectively. The counter specification module 406 the tensor counter that is a data structure comprising the plurality of ranks to track the behavior of the member based on the action rule, comprising, for each dimension, a first data object that stores a name of the behavior and a second data object that comprises a plurality of keys and a plurality of values associated with the plurality of keys. The counter specification module 406 provides a computationally efficient way of specifying and implementing the tensor counter by eliminating a need to specify a counter for each combination of the plurality of dimensions. Further, the counter specification module 406 reduces a storage requirement by only storing data associated with those combinations of the plurality of dimensions instead of storing data associated with all possible combinations of the plurality of dimensions. Further, the method provides efficient personalization for member tracking in a computationally efficient way as a read operation of the tensor counter requires only a single value to be read.

The transaction parsing module 408 determines, upon receiving a transaction data associated with the member, the name of the behavior, a dimension associated with the behavior and an updated value of the behavior with respect to the plurality of dimensions.

The counter update module 410 indexes at least one key of the second data object, wherein the at least one key is determined based on the dimension. The counter update module 410 modifies a value associated with the key using the updated value of the behavior to track the behavior of the member in the dimension associated with the key. The counter update module 410 updates the tensor counter that comprises the first data object and the second data object to track the behavior of the member collectively across the plurality of dimensions. The action triggering module 412 triggers the action to the member when the behavior of the member matches the action rule.

Figure 5:
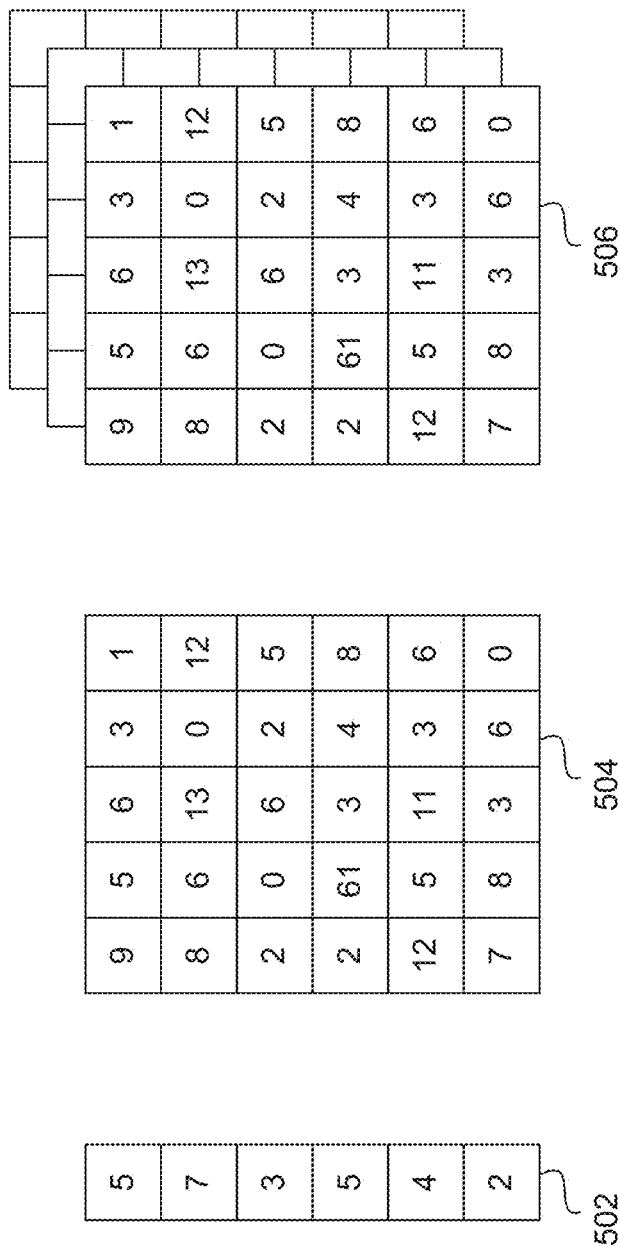
FIG. 5 illustrates tensor counters of various ranks, according to some embodiments herein.

In some embodiments, the tensor counter is specified visually by using the application program as a visual programming application program, which is described in FIG. 5 of this specification. Optionally, the visual programming application program may include a visual programming block that is enabled to receive (i) a user input (ii) a user selection from selectable options, wherein the user input and the user selection is transferred to a template program.

In some embodiments, the tensor counter comprises a plurality of thresholds for each member, wherein different actions are triggered when the behavior of the member matches the action rule with respect to the plurality of thresholds.

In some embodiments, the tensor counter is configured to track a target across a plurality of members for an offer rule.

In some embodiments, the tensor counter is specified visually by using the visual programming application program.

In some embodiments, each of the visual programming blocks is associated to a template program that translates one or more characteristics of the visual programming block to a domain specific language.

In some embodiments, the method further comprises collectively tracking an activity level behavior of the member that includes an economic activity or a social media activity using the tensor counter.

In some embodiments, the method further comprises collectively tracking an offer level behavior of the member that includes a plurality of activity level behavior using the tensor counter.

In some embodiments, a performance score for the member is determined using a plurality of tensor counters that are associated with the member. Optionally, the tensor counter is stored in a non-relational database.

FIG. 5 illustrates tensor counters of various ranks, according to some embodiments herein. A first tensor counter 502 of rank 1, a second tensor counter 504 of rank 2 and a third tensor counter of rank 3 are illustrated. As an example, the first tensor counter 502 may track the behavior of the member across one dimension which is the location dimension and the second tensor counter 504 may track the behavior of the member across two dimensions that are the location dimension and the store dimension. Similarly, the third tensor counter 506 may track the behavior of the member across three dimensions that are the location dimension, the store dimension and the sponsor dimension. The tensor counter has one or more rank, which means the tensor counter tracks the behavior of the member across one or more dimensions. The tensor counter may have n (a positive integer) number of keys for n dimensions.

Figure 6:
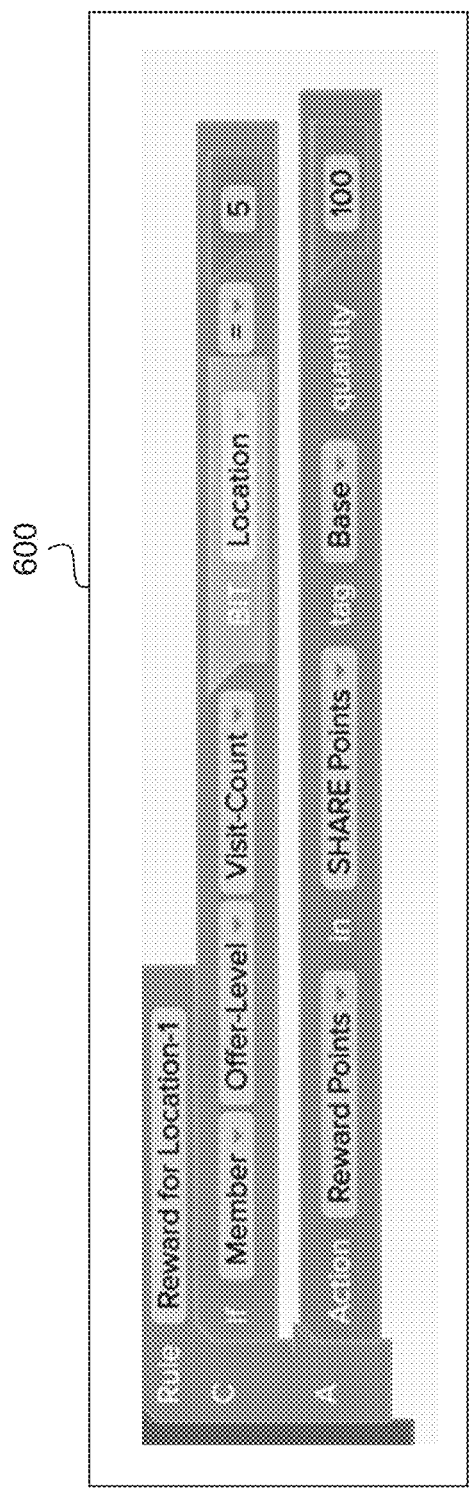
FIG. 6 is an exemplary screenshot of a user device of FIG. 2 that illustrates a view of a visual programming application program for specifying the tensor counter visually, according to some embodiments herein.

FIG. 6 is an exemplary screenshot 600 of the user device 204 of FIG. 2 that illustrates a view of a visual programming application program for specifying a tensor counter visually, according to some embodiments herein. As described in the exemplary screenshot 600, a single tensor counter will store all 100 values. A single statement can read the value of the counter by using the counter name and passing the location ID from where this transaction has come. Hence a single action rule will suffice to set up the above business scenario. To implement the above business scenario using the Tensor counter, we define a single tensor counter called "Visit Count", and whenever the member does any transaction in any location, the tensor counter is incremented by passing the location ID.

Figure 7A:
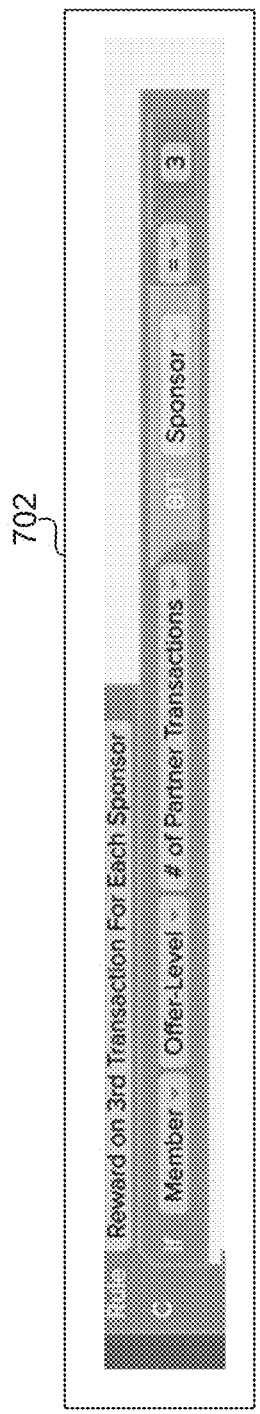
FIGS. 7A-B are exemplary screenshots of the user device of FIG. 2 that illustrate a read operation and an update operation of the tensor counter, according to some embodiments herein.

FIG. 7A is an exemplary screenshot of the user device 204 of FIG. 2 that illustrate a read operation of the tensor counter, according to some embodiments herein. The read operation of the tensor counter requires two values, namely an attribute name, and an index. As described in FIG. 7A, the index is "Location". Optionally, the tensor counter may be read at the visual language rules engine 208 to either show a performance of the member or to reward or recognize the member.

Figure 7B:
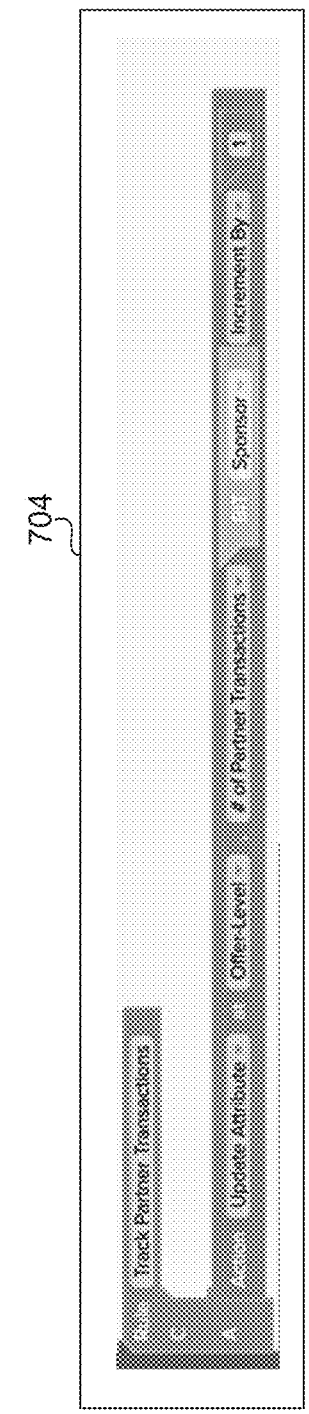

FIG. 7B is an exemplary screenshot of the user device 204 of FIG. 2 that illustrates an update operation of the tensor counter, according to some embodiments herein. The update operation of the tensor counter requires three values, namely a name of the tensor counter, an index and the updated value of the tensor counter. The tensor counter may be updated in the visual language rules engine 208 using an offer rule.

FIGS. 8A-B illustrate storing of an activity level tensor counter and an offer level tensor counter, according to some embodiments herein. The tensor counter may be stored in the visual language rules engine 208 as a map like data structure while the transaction data is getting processed. Optionally, the tensor counter may persist in a NoSQL database (DynamoDB).

In an embodiment, the index and values are stored as a map, where index is key and value is map. This is applicable for Activity level and offer level tensor counters.

Example

```
{
"Counter Name" : "Category Wise Spend",
"Data" : [
 {
  "Index" : "Dairy",
  "Value" : 50
 },
 {
  "Index" : "Electronics",
  "Value" : 100
 }
]
}
```

Figure 9:
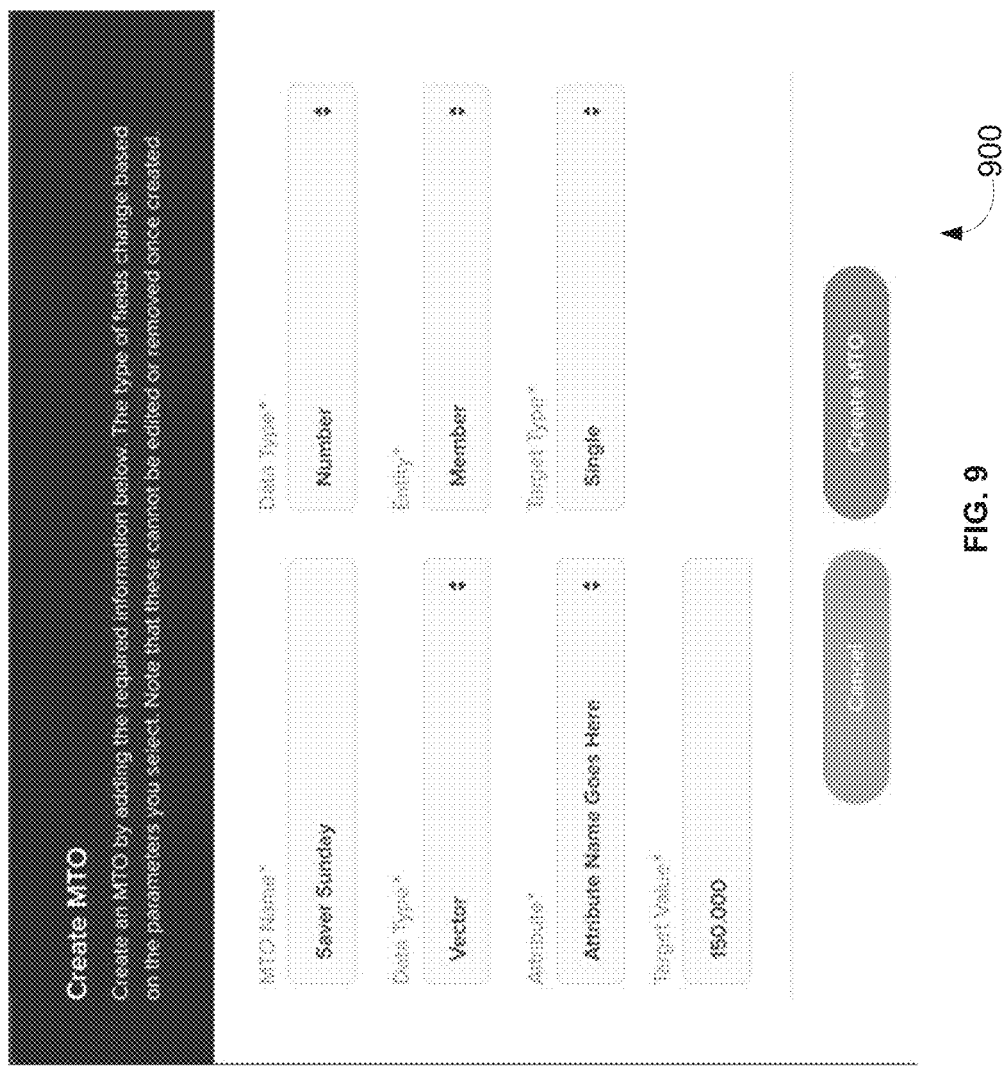
FIG. 9 is an exemplary screenshot of the user device of FIG. 2 that illustrates specifying the tensor counter using a form-based input, according to some embodiments herein.

FIG. 9 is an exemplary screenshot of the user device 204 of FIG. 2 that illustrates specifying the tensor counter using a form-based input, according to some embodiments herein.

Figure 10:
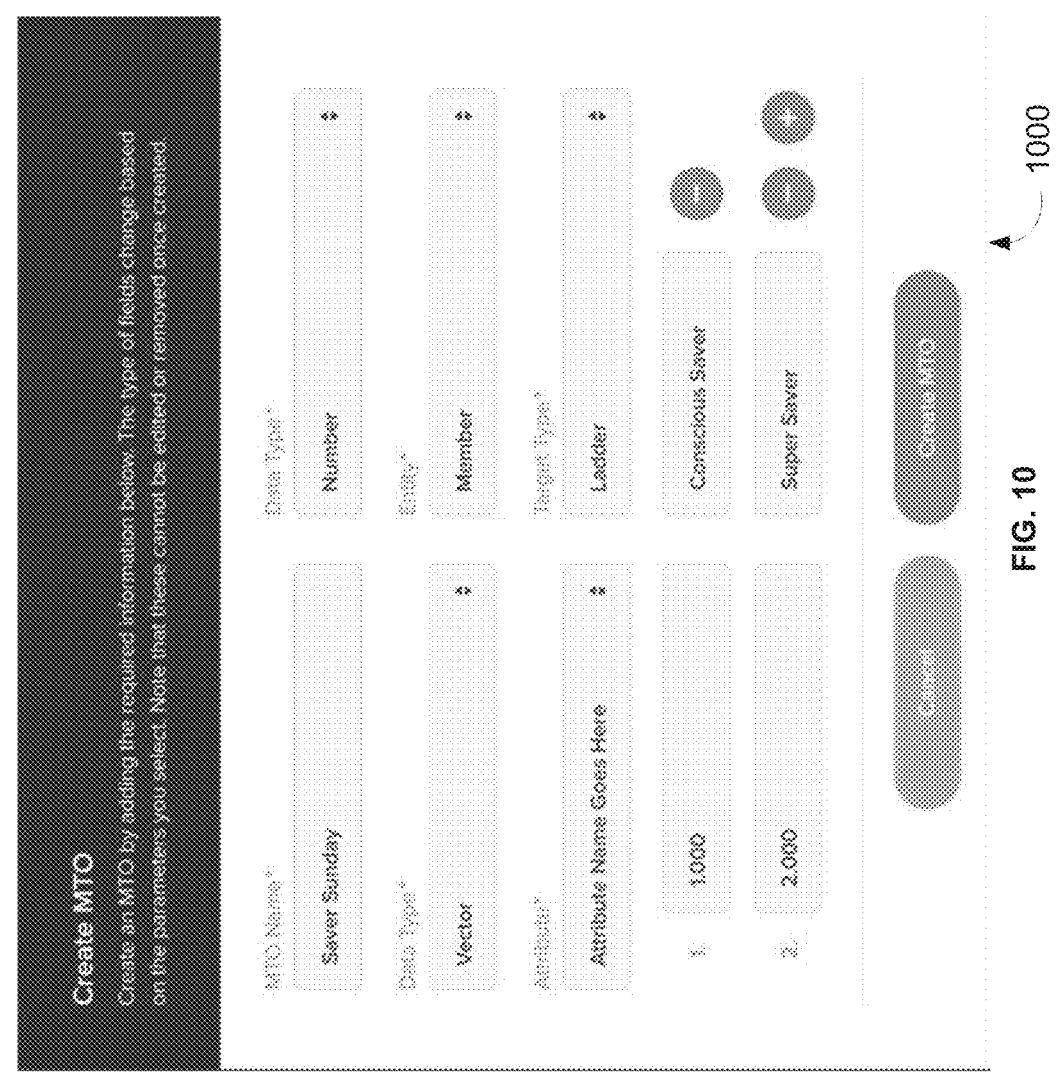

FIG. 10 is an exemplary screenshot of the user device 204 of FIG. 2 that illustrates specifying different actions for different thresholds of a cumulative behavior that is tracked using the tensor counter of FIG. 9, according to some embodiments herein. As specified, different actions are triggered for different thresholds of a cumulative behavior that is tracked using the tensor counter, which may also be referred to as "ladder promotion".

Figure 11:
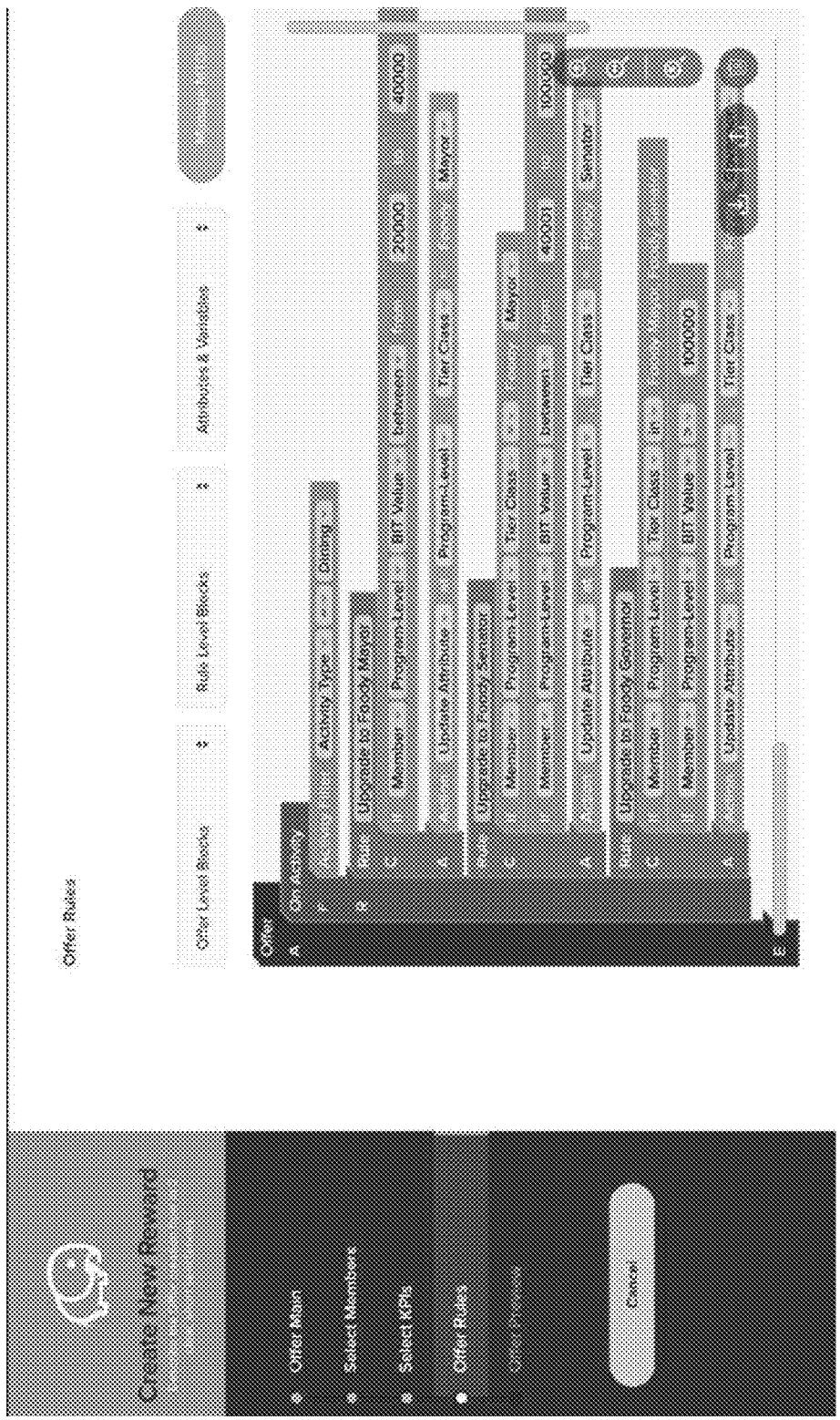
FIG. 11 is an exemplary screenshot of the user device of FIG. 2 that illustrates a view for managing different action rules, according to some embodiments herein.

FIG. 11 is an exemplary screenshot of the user device 204 of FIG. 2 that illustrates a view for managing different action rules, according to some embodiments herein.

Figure 12:
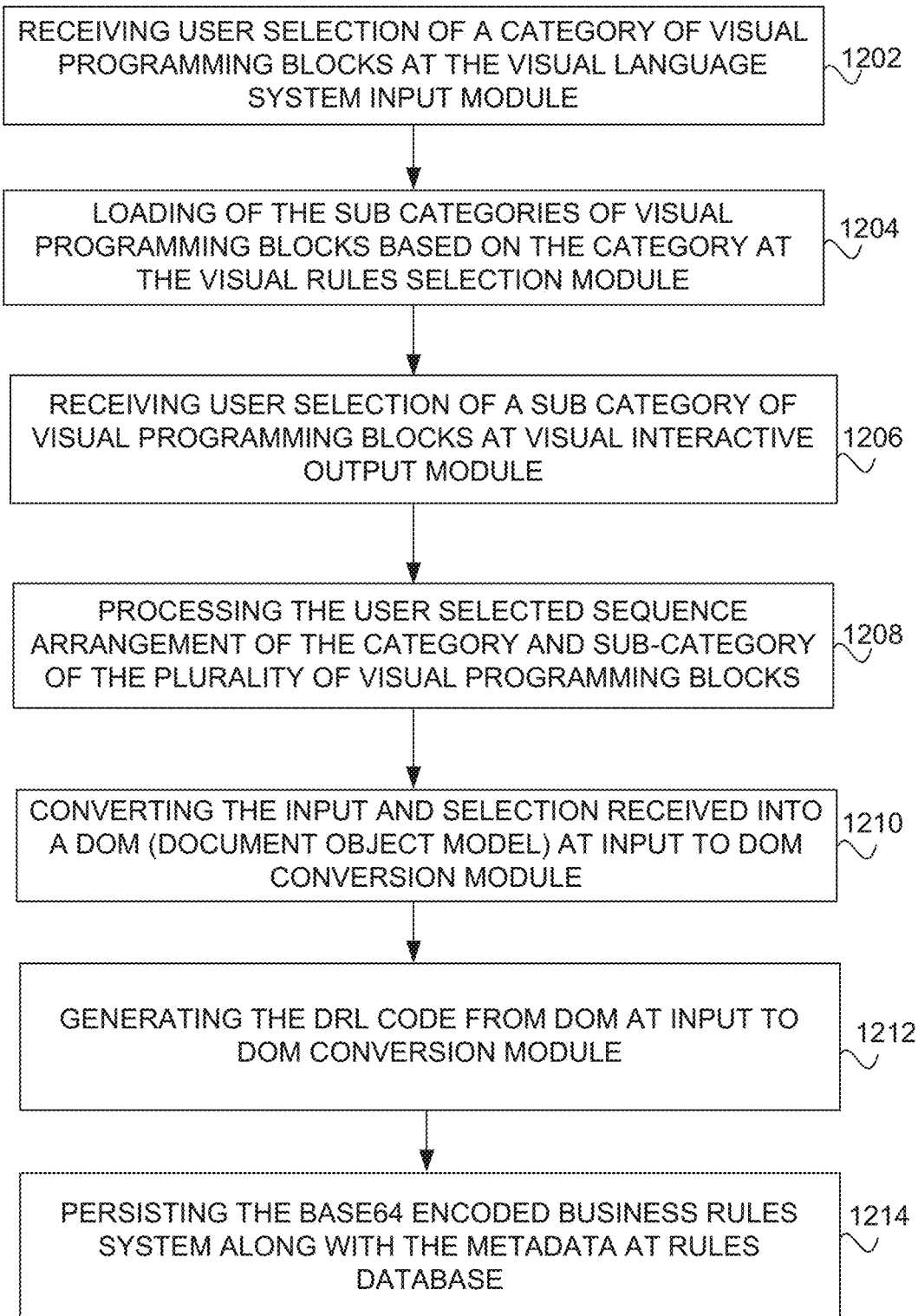
FIG. 12 is a flow diagram that illustrates a method of visual language programming according to an embodiment herein.

FIG. 12 is a flow diagram that illustrates a method of setting the rules in the visual language according to an embodiment herein. The method includes, at step 1202, receiving user selection of a category of visual programming blocks from the plurality of categories of the visual programming blocks at the visual language system input module, wherein the user selects the input from multiple selectable categories. The method includes, at step 1204, loading of sub categories of the visual programming blocks based on the category at visual rules selection module. The method includes, at step 1206, receiving user selection of a sub category of visual programming blocks at visual interactive output module 204. The method includes, at step 1208, processing the user selected sequence of arrangement of the category and the sub category of the plurality of the visual programming blocks. The method includes, at step 1210, converting the input and selection received of the visual language block arrangement into document object model (DOM) at the input to DOM conversion module. The method includes, at step 1212, generating DRL code from DOM. The method includes, at step 1214, persisting the base64 encoded DRL along with the metadata into the rules database 326.

Figure 13A:
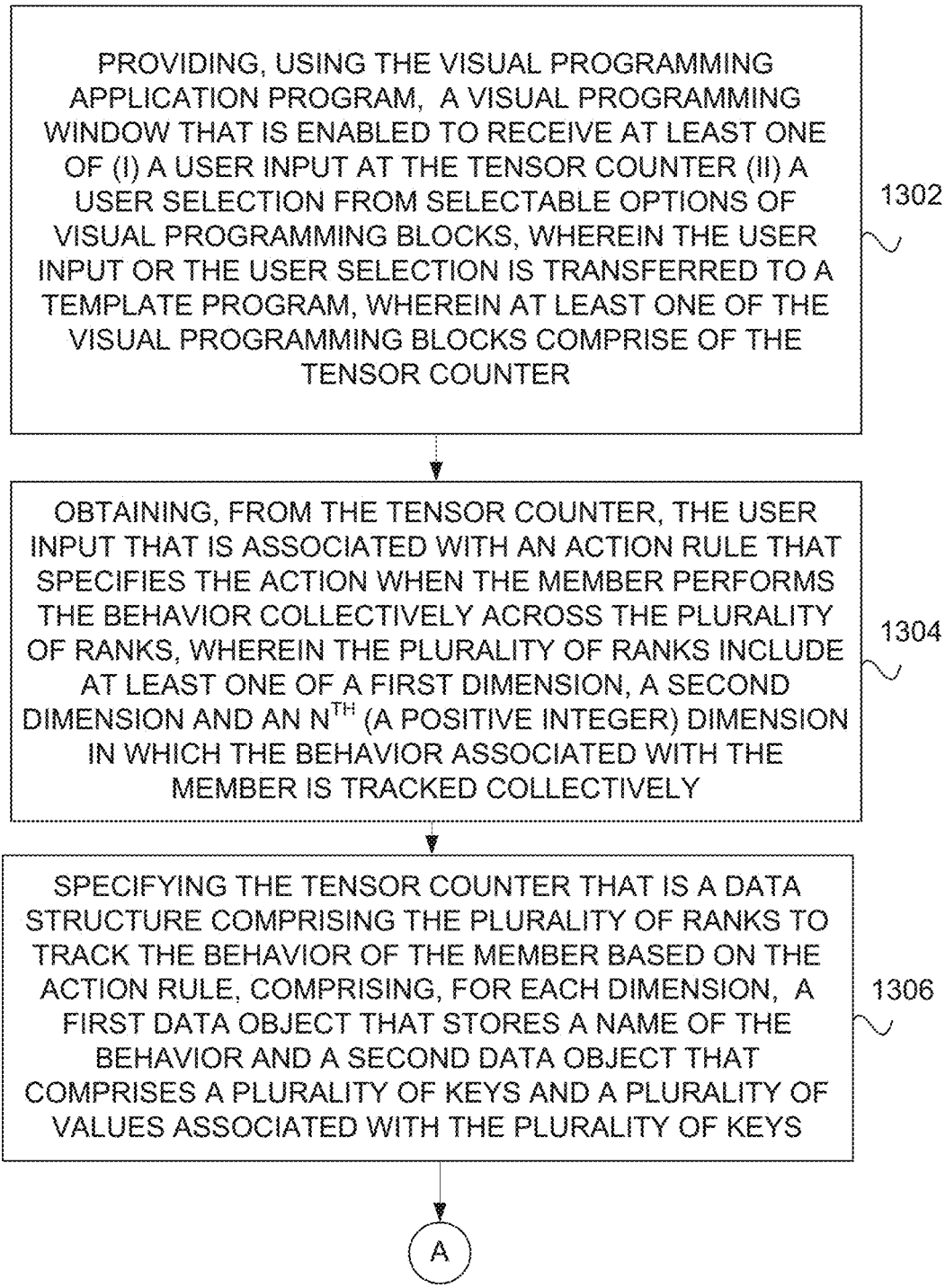
FIGS. 13A-C are flow diagrams of a method for triggering an action by collectively tracking a behavior of a member across a plurality of dimensions using a tensor counter for access by an application program being executed on a data processing system, according to some embodiments herein.
Figure 13B:
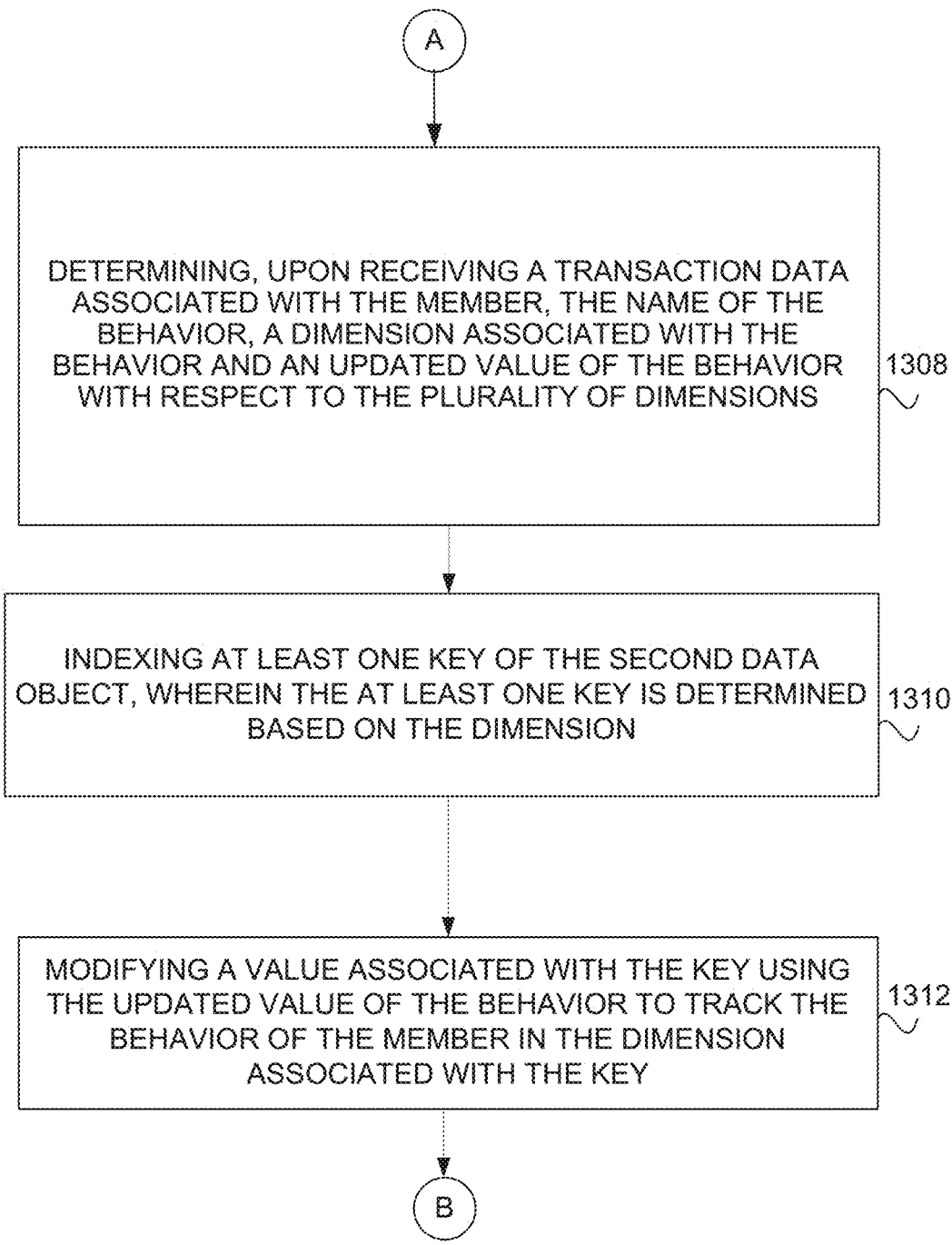
Figure 13C:
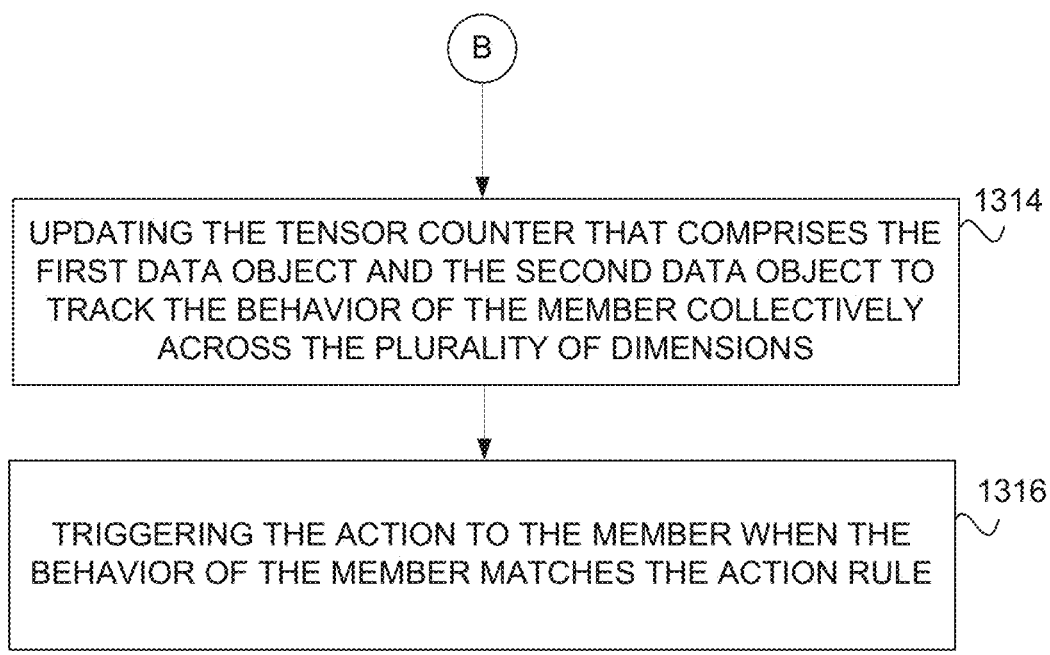

FIGS. 13A-C are flow diagrams of a method for triggering an action by collectively tracking a behavior of a member across a plurality of dimensions using a tensor counter for access by an application program being executed on a data processing system, according to some embodiments herein. At step 1302, the method includes providing, using the visual programming application program, a visual programming window that is enabled to receive (i) a user input at the tensor counter (ii) a user selection from selectable options of visual programming blocks, wherein the user input and the user selection is transferred to a template program, wherein at least one of the visual programming blocks comprise of the tensor counter. At step 1304, the method includes obtaining, from the tensor counter, the user input that is associated with an action rule that specifies the action when the member performs the behavior collectively across the plurality of ranks, wherein the plurality of ranks include at least one of a first dimension, a second dimension and an $N^{th}$ (a positive integer) dimension in which the behavior associated with the member is tracked collectively. At step 1306, the method includes specifying the tensor counter that is a data structure comprising the plurality of ranks to track the behavior of the member based on the action rule, comprising, for each dimension, a first data object that stores a name of the behavior and a second data object that comprises a plurality of keys and a plurality of values associated with the plurality of keys. At step 1308, the method includes determining, upon receiving a transaction data associated with the member, the name of the behavior, a dimension associated with the behavior and an updated value of the behavior with respect to the plurality of dimensions. At step 1310, the method includes indexing at least one key of the second data object, wherein the at least one key is determined based on the dimension. At step 1312, the method includes modifying a value associated with the key using the updated value of the behavior to track the behavior of the member in the dimension associated with the key. At step 1314, the method includes updating the tensor counter that comprises the first data object and the second data object to track the behavior of the member collectively across the plurality of dimensions. At step 1316, the method includes triggering the action to the member when the behavior of the member matches the action rule.

The various systems and corresponding components described herein and/or illustrated in the figures may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The systems that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU or GPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 14:
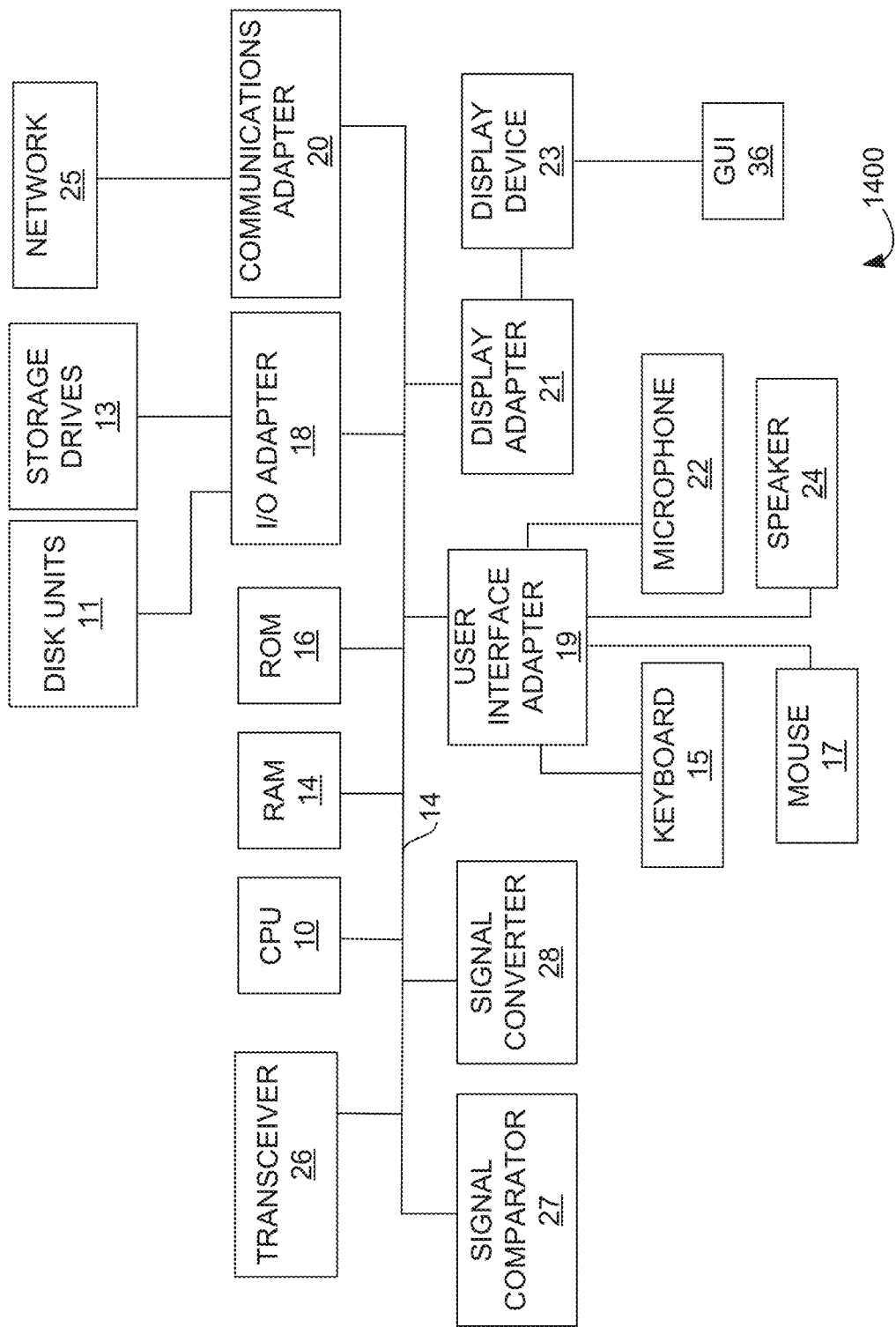
FIG. 14 is a schematic diagram of a computer architecture, in accordance with the embodiments herein.

A representative hardware environment for practicing the embodiments herein is depicted in FIG. 14, with reference to FIGS. 1 through 13B. This schematic drawing illustrates a hardware configuration of a software development device/computer system 900 in accordance with the embodiments herein. The system 1400 comprises at least one processor or central processing unit (CPU) 10. The CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 900 can read the inventive instructions on the program storage devices and follow these instructions to execute the methodology of the embodiments herein. The system 900 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23, which provides a graphical entity interface (GUI) 36 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope.

What is claimed is:

1. A processor-implemented method of triggering an action by tracking a behavior of a member collectively across a data set using a plurality of ranks in a tensor counter of at least one visual programming block for access by a visual programming application program being executed on a data processing system, the method comprising:
providing, using the visual programming application program, a visual programming window that is enabled to receive (i) a user input at the tensor counter (ii) a user selection from selectable options of visual programming blocks, wherein the user input and the user selection is transferred to a template program, wherein at least one of the visual programming blocks comprise of the tensor counter;
obtaining, from the tensor counter, the user input that is associated with an action rule that specifies the action when the member performs the behavior collectively across the plurality of ranks, wherein the plurality of ranks include at least one of a first dimension, a second dimension and an $N^{th}$ (a positive integer) dimension in which the behavior associated with the member is tracked collectively;
specifying the tensor counter that is a data structure comprising the plurality of ranks to track the behavior of the member based on the action rule, comprising, for each dimension, a first data object that stores a name of the behavior and a second data object that comprises a plurality of keys and a plurality of values associated with the plurality of keys;
determining, upon receiving a transaction data associated with the member, the name of the behavior, a dimension associated with the behavior and an updated value of the behavior with respect to the plurality of dimensions;
indexing at least one key of the second data object, wherein the at least one key is determined based on the dimension;
modifying a value associated with the key using the updated value of the behavior to track the behavior of the member in the dimension associated with the key;
updating the tensor counter that comprises the first data object and the second data object to track the behavior of the member collectively across the plurality of dimensions; and triggering the action to the member when the behavior of the member matches the action rule.

2. The processor implemented method of claim 1, wherein the tensor counter comprises a plurality of thresholds for each member, wherein different actions are triggered when the behavior of the member matches the action rule with respect to the plurality of thresholds.

3. The process implemented method of claim 2, wherein the tensor counter is configured to track a target across a plurality of members for an offer rule.

4. The processor implemented method of claim 1, wherein the tensor counter is specified visually by using the visual programming application program.

5. The process implemented method of claim 4, wherein each of the visual programming blocks is associated to a template program that translates one or more characteristics of the visual programming block to a domain specific language.

6. The processor implemented method of claim 1, wherein the method further comprises collectively tracking an activity level behavior of the member that includes an economic activity or a social media activity using the tensor counter.

7. The processor implemented method of claim 5, wherein the method further comprises collectively tracking an offer level behavior of the member that includes a plurality of activity level behavior using the tensor counter.

8. The processor implemented method of claim 1, wherein a performance score for the member is determined using a plurality of tensor counters that are associated with the member.

9. The processor implemented method of claim 1, wherein the tensor counter is stored in a non-relational database.

10. A memory system for collectively tracking a behavior of triggering an action by tracking a behavior of a member collectively across a data set using a plurality of ranks in a tensor counter of at least one visual programming block for access by a visual programming application program being executed on a data processing system, the memory system comprising:

a visual programming application program that includes a visual programming window that is enabled to receive (i) a user input at a tensor counter (ii) a user selection from selectable options of visual programming blocks, wherein the user input and the user selection is transferred to a template program, wherein at least one of the visual programming blocks comprise of a tensor counter; and the tensor counter stored in a memory, wherein the tensor counter is a data structure and includes information resident in a database used by the visual programming application program and includes, for each of a plurality of dimensions:

a first data object configured to store a name for the behavior; and a second data object for each of the plurality of dimensions, wherein the second data object comprises:

a plurality of keys associated with the first data object that provide an index for a dimension, including at least one of a first dimension, a second dimension and an $N^{th}$ (a positive integer) dimension in which the behavior associated with the member is tracked collectively, wherein the plurality of dimensions are comprised by a plurality of ranks; and a plurality of values associated with the plurality of keys that determine a count of the behavior in the dimension.

11. The memory system of claim 10, wherein the tensor counter is stored in a non-relational database.

12. One or more non-transitory computer-readable storage medium storing the one or more sequence of instructions, which when executed by the one or more processors, causes to perform a method of triggering an action by collectively tracking a behavior of a member collectively across a plurality of dimensions for access by a visual programming application program being executed on a data processing system comprising:

providing, using the visual programming application program, a visual programming window that is enabled to receive (i) a user input at the tensor counter (ii) a user selection from selectable options of visual programming blocks, wherein the user input and the user selection is transferred to a template program, wherein at least one of the visual programming blocks comprise of the tensor counter;

obtaining, from the tensor counter, the user input that is associated with an action rule that specifies the action when the member performs the behavior collectively across the plurality of ranks, wherein the plurality of ranks include at least one of a first dimension, a second dimension and an $N^{th}$ (a positive integer) dimension in which the behavior associated with the member is tracked collectively;

specifying the tensor counter that is a data structure comprising the plurality of ranks to track the behavior of the member based on the action rule, comprising, for each dimension, a first data object that stores a name of the behavior and a second data object that comprises a plurality of keys and a plurality of values associated with the plurality of keys;

determining, upon receiving a transaction data associated with the member, the name of the behavior, a dimension associated with the behavior and an updated value of the behavior with respect to the plurality of dimensions;

indexing at least one key of the second data object, wherein the at least one key is determined based on the dimension;

modifying a value associated with the key using the updated value of the behavior to track the behavior of the member in the dimension associated with the key;

updating the tensor counter that comprises the first data object and the second data object to track the behavior of the member collectively across the plurality of dimensions; and triggering the action to the member when the behavior of the member matches the action rule.

13. The non-transitory computer readable storage medium storing the sequence of instructions of claim 12, wherein the tensor counter comprises a plurality of thresholds for each member, wherein different actions are triggered when the behavior of the member matches the action rule with respect to the plurality of thresholds.

14. The non-transitory computer readable storage medium storing the sequence of instructions of claim 12, the tensor counter is configured to track a target across a plurality of members for an offer rule.

15. The non-transitory computer readable storage medium storing the sequence of instructions of claim 12, wherein the tensor counter is specified visually by using the visual programming application program.

16. The non-transitory computer readable storage medium storing the sequence of instructions of claim 15, wherein each of the visual programming blocks is associated to a template program that translates one or more characteristics of the visual programming block to a domain specific language.

17. The non-transitory computer readable storage medium storing the sequence of instructions of claim 12, which when executed by the processor, further causes collectively tracking an activity level behavior of the member that includes an economic activity or a social media activity using the tensor counter.

18. The non-transitory computer readable storage medium storing the sequence of instructions of claim 16, which when executed by the processor, further causes collectively tracking an offer level behavior of the member that includes a plurality of activity level behavior using the tensor counter.

19. The non-transitory computer readable storage medium storing the sequence of instructions of claim 12, wherein a performance score for the member is determined using a plurality of tensor counters that are associated with the member.

20. The non-transitory computer readable storage medium storing the sequence of instructions of claim 12, wherein the tensor counter is stored in a non-relational database.

* * * * *